United States Patent Office 3,594,403
Patented July 20, 1971

3,594,403
9,15-DIOXOPROSTA-8(12),13-DIENOIC ACID AND METHYL ESTER
Masateru Miyano, Morton Grove, Ill., assignor to G. D. Searle & Co., Chicago, Ill.
No Drawing. Continuation-in-part of application Ser. No. 688,981, Dec. 8, 1967. This application Jan. 8, 1968, Ser. No. 696,101
Int. Cl. C07c 61/36, 67/74
U.S. Cl. 260—468  3 Claims

ABSTRACT OF THE DISCLOSURE 9,15-dioxoprosta-8(12),13-dienoic acid derivatives useful as hypocholesterolemic, anti-ulcerogenic and anti-protozoal agents and preparable by the condensation of 6-hexanoylbicyclo[2.2.1]hept-2-en-5-yl chloromethyl ketone with dimethyl 3-oxoundecane-1,11-dioate followed by hydrolysis, decarboxylation, esterification and pyrolysis of the resulting adduct to afford methyl 9,15-dioxo-prosta-8(12),13-dienoate, which is reduced and/or saponified to afford the related derivatives.

---

This application is a continuation-in-part of my copending application Ser. No. 688,981, filed Dec. 8, 1967. The present invention relates to novel compounds characterized by the prostanoic acid ring structure and, more particularly, with derivatives of 9,15-dioxoprosta-8(12),13-dienoic acid represented by the following structural formula

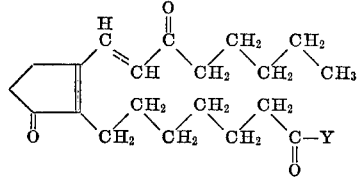

wherein the dotted line indicates that the linkage between carbon atoms 13 and 14 is a single bond or a double bond, Y is a lower alkoxy group when said linkage is a double bond and Y is a hydroxy or lower alkoxy group when said linkage is a single bond.

The lower alkoxy radicals designated by the Y term are typified by methoxy, ethoxy propoxy, butoxy, pentyloxy, hexyloxy, heptyloxy and the branched-chain isomers thereof.

A convenient process for manufacture of the instant compounds utilizes 6-hexanoylbicyclo[2.2.1]hept-2-en-5-oic acid as the starting material. That acid is allowed to react with oxalyl chloride to afford the corresponding acid chloride, which is contacted with diazomethane, thus producing the corresponding diazomethyl ketone. Reaction of the latter intermediate with hydrogen chloride results in 6-hexanoylbicyclo[2.2.1]hept-2-en-5-yl chloromethyl ketone. Condensation of that ketone with dimethyl 3-oxoundecane-1,11-dioate followed by hydrolysis, decarboxylation, esterification with a diazoalkane and pyrolysis of the resulting adduct results in the instant alkyl 9,15-dioxoprosta-8(12),13-dienoates. When the esterifying agent is diazomethane, methyl 9,15-dioxoprosta-8(12),13-dienoate is produced. Chemical reduction of the instant 9,15-dioxo-8(12),13-bisdehydro substances results in conversion of the 13, 14-double bond to a saturated linkage. Methyl 9,15-dioxoprosta-8(12),13-dienoate thus affords methyl 9,15-dioxoprost-8(12)-enoate when allowed to react with zinc and acetic acid.

The instant carboxylic acid is conveniently produced by saponification of the corresponding esters. Methyl 9,15-dioxoprost-8(12)-enoate is thus allowed to react with aqueous sodium hydroxide in methanol to afford 9,15-dioxoprost-8(12)-enoic acid.

The compounds of this invention display valuable pharmacological properties. They are, for example, anti-protozoal agents as is evidenced by their ability to inhibit the growth of such organisms as *Tetrahymena gelleii*. The pharmacological activity of the instant compounds is specifically illustrated by the inhibitory effect demonstrated by methyl 9,15-dioxoprosta-8(12),13-dienoate on the growth of *Tetrahymena gelleii*. For that determination the following assay was used:

A sterile nutrient medium of the following composition:

Proteose peptone—12 g.
Sucrose—8 g.
Distilled water—1000 ml.

is inoculated with a viable axenic culture of *Tetrahymena gelleii*, then is incubated at about 25° C. for 24 hours. At the end of that time, 0.5 ml. quantities are transferred aseptically to test tubes containing approximately 5 mg. of the test compound. The test tubes containing the culture alone serve as controls. At the end of a second 24-hour incubation period, the tubes are examined microscopically in order to determine the degree of growth of the test organism. A compound causing a definite inhibition of growth of the organism as compared to the controls is considered active.

The invention will appear more fully from the examples which follow. These examples are given by way of illustration only and are not to be construed as limiting the invention either in spirit or in scope as many modifications both in materials and methods will be apparent from this disclosure to those skilled in the art. In the following examples temperatures are given in degrees centigrade (° C.) and quantities in parts by weight unless otherwise noted.

EXAMPLE 1

To a solution of 27 parts of trans-6-hexanoylbicyclo-[2.2.1]hept-2-en-5-oic acid in 88 parts of benzene is added 30 parts of oxalyl chloride. The resulting reaction mixture is heated at the reflux temperature for about 10 minutes, then is concentrated to dryness under reduced pressure to afford trans-6-hexanoylbicyclo[2.2.1]hept-2-en-5-oyl chloride. That residue is dissolved in benzene and added to 1000 parts by volume of an ethereal diazomethane solution which has been prepared by the reaction of 28 parts of nitrosomethylurea with excess aqueous potassium hydroxide in ether. After about two hours, the mixture containing 6-hexanoylbicyclo[2.2.1]hept-2-ene-5-carbonyldi-azomethane is saturated with dry hydrogen chloride and that mixture is allowed to stand at room temperature for about 90 minutes, then is washed successively with water, dilute aqueous sodium bicarbonate and water and dried over anhydrous sodium sulfate. The resulting residue is distilled at 0.2 mm. pressure and the fraction boiling at 146–147° is collected, thus affording trans-6-hexanoyl-bicyclo[2.2.1]hept-2-en-5-yl chloromethyl ketone.

EXAMPLE 2

A mixture containing 11.8 parts of trans-6-hexanoyl-bicyclo[2.2.1]hept-2-en-5-yl chloromethyl ketone, 15 parts of potassium acetate and 80 parts of ethanol is heated at the reflux temperature for about two hours, then is concentrated under reduced pressure and diluted with water. That aqueous mixture is extracted with ether and the ether layer is separated, washed with water, dried over anhydrous sodium sulfate and stripped of solvent under reduced pressure. The resulting residue is fractionally distilled under reduced pressure to afford the crude product, boiling at 145–153° at 0.25–0.3 mm. pressure. That material is purified by redistillation at 0.3 mm. pressure to afford pure trans-6-hexanoylbicyclo[2.2.1]hept-2-en-5-yl acetoxymethyl ketone, boiling at 145–148°.

EXAMPLE 3

A suspension of 12 parts of trans-6-hexanoylbicyclo-[2.2.1]hept-2-en-5-oic acid in 50 parts of water and 80 parts of methanol is neutralized by the addition of aqueous sodium hydroxide, then is cooled to 0–5° and 3 parts of sodium borohydride is added. That reaction mixture is stored at 0–5° for about 16 hours, then is allowed to warm to room temperature and stored for about 6 hours. Acidification of the mixture with hydrochloric acid followed by dilution with water affords an aqueous solution, which is cooled at 0–5° in order to induce crystallization of the product. The white leaflet-like crystals are collected by filtration, washed with water and dried to afford a mixture of the epimeric trans-6-(1-hydroxyhexyl)bicyclo[2.2.1]-hept-2-en-5-oic acids melting at about 130–152°. That mixture is purified by recrystallization first from benzene then from ethyl acetate to afford trans-6-(1-hydroxyhexyl)bicyclo[2.2.1]hept-2-en-5-oic acid, melting at about 164–165°.

EXAMPLE 4

To a solution of 2.6 parts of trans-6-(1-hydroxyhexyl)-bicyclo[2.2.1]hept-2-en-5-oic acid in 360 parts of ethyl acetate is added excess ethereal diazomethane and that mixture is allowed to stand at room temperature for about 5 minutes, then is concentrated to dryness under reduced pressure. The resulting residue is extracted into benzene and the benzene solution is stripped of solvent, then distilled at 0.3 mm. pressure to afford trans-methyl 6-(1-hydroxyhexyl)bicyclo[2.2.1]hept-2-en-5-oate, boiling at about 130–132°.

EXAMPLE 5

A solution of trans-6-hexanoylbicyclo[2.2.1]hept-2-en-5-yl chloromethyl ketone (prepared from 40 parts of trans-6-hexanoylbicyclo[2.2.1]hept-2-en-5-oic acid according to the procedure described in Example 1) in 100 parts of anhydorus pyridine is allowed to stand at room temperature for about 48 hours, at the end of which time the crystals which have formed are collected by filtration, washed with dioxane, then dissolved in ethanol. The resulting solution is filtered and the filtrate is diluted with dioxane. That solution is stored at 0–5° for about 1 hour, thus producing colorless leaflet-like crystals, which are isolated by filtration and washed with dioxane, then dried to afford 5-pyridiniummethylcarbonyl-6-hexanoylbicyclo-[2.2.1]hept-2-ene chloride, melting at about 186° with decomposition.

EXAMPLE 6

To a solution of 24.6 parts of trans-5-pyridiniummethyl-carbonyl-6-hexanoylbicyclo[2.2.1]hept-2-ene chloride in 40 parts of ethanol is added 10.6 parts of p-dimethylamino-nitrosobenzene dissolved in 160 parts of ethanol. That reaction mixture is stirred at 0–5° while 70 parts by volume of 1 N aqueous sodium hydroxide is added. The initial greenish solution gradually turns reddish brown and after about 10 minutes crystallization commences. The mixture is then stored at 0–5° for about 16 hours and the light brown crystals are collected by filtration, washed on the filter with cold aqueous ethanol and dried to yield the crude product. That material is extracted with acetone and the extract is concentrated under nitrogen to afford a residue, which is purified by recrystallization from aqueous ethanol thus affording pure trans-p-dimethylamino-N-(6-hexanoylbicyclo[2.2.1]hept-2-ene-5 - carbonylmethylene) aniline N-oxide, melting at about 125°.

EXAMPLE 7

To a suspension of 8 parts of sodium metal in 352 parts of benzene is added portionwise 93 parts of dimethyl 3-oxoundecane-1,11-dioate. To the resulting clear solution is then added 48.7 parts of trans-6-hexanoylbicyclo[2.2.1]hept-2-en-5-yl chloromethyl ketone dissolved in 44 parts of benzene. The resulting mixture is stirred at room temperature for about 30 minutes, then is heated at the reflux temperature for about 3½ hours. The reaction mixture is cooled, then washed successively with cold hydrochloric acid and dilute aqueous sodium chloride, dried over anhydrous sodium sulfate and concentrated to dryness under reduced pressure. That residue is dissolved in 3800 parts by volume of 50% aqueous dioxane containing 127 parts of sodium hydroxide and the resulting solution is stirred in a nitrogen atmosphere for about 2 hours, allowed to stand at room temperature for about 16 hours, then stirred at about 65° for 3 hours, cooled and poured into a mixture of ice and 350 parts by volume of concentrated hydrochloric acid. Extraction of that aqueous acidic mixture with ether affords an organic solution, which is separated, washed with aqueous sodium chloride, then dried over anhydrous sodium sulfate and concentrated to dryness under reduced pressure. To a solution of that residue in 548 parts of quinoline is added 0.8 part of copper powder and the resulting reaction mixture is heated at 120–126° for about 5 hours in a nitrogen atmosphere, then is cooled and poured into a mixture of ice and hydrochloric acid. That aqueous mixture is extracted with ether and the ether solution is separated and washed with aqueous sodium chloride. An ethereal solution of diazomethane, prepared in the usual manner from 100 parts of nitrosomethylurea, is added and after standing for about 5 minutes, the mixture is concentrated under reduced pressure to afford a dark oil. That oily material is fractionally distilled and the fractions boiling between 155° and 185° at 0.03–0.04 mm. pressure are collected. Those fractions which exhibit an ultraviolet absorption maximum at about 296 millimicrons are combined and purified by sausage chromatography on silica gel followed by elution with ethyl acetate-methanol solutions. In that manner there is obtained pure methyl 9,15-dioxoprosta-8(12),13-dienoate, which is characterized by an ultraviolet absorption maximum at about 296 millimicrons with a molecular extinction coefficient of 19,300–22,800. It is represented by the following structural formula

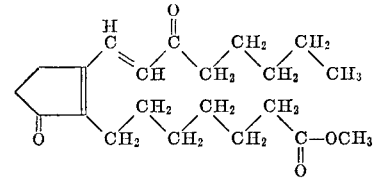

EXAMPLE 8

A mixture containing 1.1 parts of methyl 9,15-dioxoprosta-8(12),13-dienoate, 1.5 parts of zinc powder and 52.5 parts of acetic acid is stirred at room temperature for about 5 hours then is filtered in order to remove excess zinc. The filtrate is poured into cold aqueous potassium bicarbonate. That aqueous mixture is extracted with ether and the ether extract is dried over anhydrous sodium sulfate, then concentrated to dryness under reduced pressure. Purification of the resulting residue by chromatography on silica gel followed by elution with 25% ethyl acetate in benzene affords methyl 9,15-dioxoprost-8(12)-enoate as a pale yellow oil. It exhibits an ultraviolet absorption maximum at 238 millimicrons with a molecular extinction coefficient of about 13,400. In the infrared, a chloroform solution displays peaks at about 5.76–5.87 and 6.09 microns. This compound is represented by the following structural formula

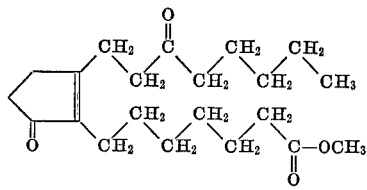

EXAMPLE 9

To a solution of 0.2 part of methyl 9,15-dioxoprost-8(12)-enoate in 8 parts of methanol is added 1 part by volume of 10% aqueous sodium hydroxide and that reaction mixture is allowed to stand at room temperature for about 20 hours, then is poured into 200 parts of water. That aqueous mixture is washed with ether, then is made acidic by the addition of hydrochloric acid and extracted with ether. The ether extract is separated, washed with 1% aqueous sodium chloride, dried over anhydrous sodium sulfate and concentrated under reduced pressure to afford an amber glass-like residue. Purification of that residue by chromatography on silica gel and elution with ethyl acetate affords 9,15-dioxoprost-8(12)-enoic acid as an amber glass, characterized by an ultraviolet absorption maximum of about 238 millimicrons with a molecular extinction coefficient of about 10,100 and also by the following structural formula

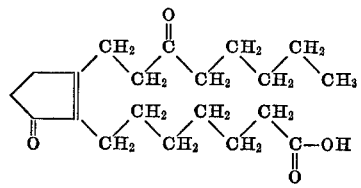

What is claimed is:
1. A compound of the formula

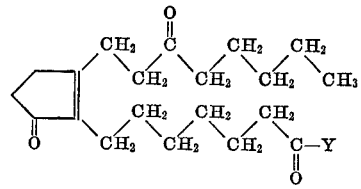

wherein Y is a member of the class consisting of hydroxy and methoxy radicals.

2. As in claim 1, the compound which is methyl 9,15-dioxoprost-8(12)-enoate.

3. As in claim 1, the compound which is 9,15-(dioxoprost-8(12)-enoic acid.

References Cited

Samuelsson: Angew Chem., Inter. Ed. 4, pp. 410–416, 1965.

CHARLES B. PARKER, Primary Examiner

R. GERSTL, Assistant Examiner

U.S. Cl. X.R.

260—193, 514, 544, 586; 424—305, 317